United States Patent [19]

Longa et al.

[11] 4,031,452

[45] June 21, 1977

[54] STABILIZED POWER SUPPLY

[75] Inventors: Pier Luigi Longa, Pavone Canavese (Turin); Piero Gamba, Banchette (Turin) both of Italy

[73] Assignee: Ing. C. Olivetti & C., S.p.A., Ivrea (Turin), Italy

[22] Filed: Oct. 6, 1975

[21] Appl. No.: 620,129

[30] Foreign Application Priority Data

Oct. 29, 1974 Italy .................... 70201/74

[52] U.S. Cl. .................... 321/2; 321/14; 321/25

[51] Int. Cl.² .................... H02M 7/04

[58] Field of Search ............ 321/2, 11, 12, 13, 14, 321/18, 25, 45 R; 323/17, 22 T, 23, 25, 38, DIG. 1

[56] References Cited

UNITED STATES PATENTS

| | | | |
|---|---|---|---|
| 3,241,035 | 3/1966 | Rhyne | 321/18 |
| 3,365,650 | 1/1968 | Camp et al. | 323/23 UX |
| 3,551,777 | 12/1970 | Bingley | 321/18 X |
| 3,564,384 | 2/1971 | Adler | 323/DIG. 1 |
| 3,571,697 | 3/1971 | Phillips | 323/DIG. 1 |
| 3,624,405 | 11/1971 | Bishop et al. | 321/25 X |
| 3,737,756 | 6/1973 | Hasley et al. | 323/DIG. 1 |
| 3,815,014 | 6/1974 | Davis et al. | 323/DIG. 1 |
| 3,818,308 | 6/1974 | Tamari | 321/25 X |

Primary Examiner—A. D. Pellinen
Attorney, Agent, or Firm—Schuyler, Birch, Swindler, McKie & Beckett

[57] ABSTRACT

The stabilization of all of the output voltages of a switching power supply is obtained by varying the time of flow of the current in a semiconductor interrupter circuit with a constant interruption repetition cycle, by controlling the interrupter through a magnetic amplifier. The power supply includes a voltage converting circuit comprising an automatic balancing circuit, magnetic amplifiers and a saturable reactor for limiting the dissipation of power in conditions of overload through an increase of the frequency of operation of the discharge stabilizing circuit.

4 Claims, 3 Drawing Figures

STABILIZED POWER SUPPLY

BACKGROUND OF THE INVENTION

The invention relates to an inductive discharge stabilized switching power supply for electronic apparatus.

Inductive discharge power supplies are known in the art by the name "switched mode", or more commonly "switching", which description will also be used in this case hereinafter.

Power supplies of the switching type are finding ever more frequent use in the supply of electronic apparatus in substitution for those comprising an iron-core transformer with mains frequency and voltage stabilization by means of transistors in series; with respect to those power supplies, those of the switching type operating at high frequencies have a better efficiency, much smaller over-all dimensions and weight and a competitive cost, notwithstanding the greater complexity of circuitry, because of the much smaller incidence of the cost of raw materials such as iron and copper.

Some of the possible solutions for switching power supplies are indicated, for example, in the article "A survey of switched mode power supplies" by L. E. Jansson, in No. 119 of "Mullard technical communications". A number of systems have been proposed which enable the output voltage of switching power supplies to be stabilized by operating on the frequency of repetition of the cycle of storage of the energy in the inductor and of the subsequent discharge to a smoothing capacitor: the frequency of repetition of the cycle is kept low under conditions of high input voltage and of limited output of the power supply; with an increase in the load, and to compensate for lowering of the input voltage, the frequency of repetition of the cycle increases and therefore a greater power is discharged by the inductor to the utilizing circuit.

These stabilizing systems have a number of disadvantages. By lowering the frequency of repetition of the cycle of storage of the energy and of the subsequent discharge, the time of response of the power supply to changes in the load and in the mains supply deteriorates and the problem of filtering the voltage delivered between the succeeding discharges of the inductor, which are more spaced in time from one another, is complicated. Moreover, with these systems, the time of flow of the current in the inductor is constant, so that at each cycle the current in the inductor reaches the maximum value; it is therefore necessary to ensure a consistent safety margin for the maximum value of this current with respect to the saturation current of the inductor. On this account, it is not possible to make the best use of the characteristics of the inductor, of which the energy stored and given up during the discharge is proportional to the square of the maximum current attained.

SUMMARY OF THE INVENTION

According to the present invention, there is provided a switching power supply for electronic apparatus comprising a rectifying circuit connected directly to the mains and an inductive discharge voltage stabilizing circuit, characterized in that the stabilization of the voltage is effected by varying the time of flow of the current in a fast semiconductor interrupter circuit with a constant interruption repetition frequency.

According to a second aspect of the invention, control of the said fast semiconductor interrupter circuit is effected through a magnetic amplifier.

According to a third aspect of the invention, the voltage produced by the said inductive discharge voltage stabilizing circuit feeds a voltage converting circuit of high frequency with a transformer having a plurality of secondaries, from which the stabilized output voltages are obtained through rectifiers and filter circuits, and the detection of a combination of the said output voltages compensates voltage drops of the said voltage converting circuit by acting on the control of the said fast semiconductor interrupter circuit.

According to a fourth aspect of the invention, the said voltage converting circuit comprises an automatic balancing circuit with magnetic amplifiers.

According to a fifth aspect of the invention, the said voltage converting circuit also has the function of a generator of waves for the timing and control of the said inductive discharge stabilizing circuit.

According to a sixth aspect of the invention, the power supply includes means adapted to detect the condition of overloading of the power supply, the said means limiting the dissipation of power in the components of the power supply under conditions of overloading through circuits which cause an increase in the frequency of operation of the said inductive discharge stabilizing circuit.

According to a seventh aspect of the invention, the said means adapted to detect the condition of overloading of the power supply comprise at least one saturable reactor.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENT

The power supply described provides all the direct-current voltages necessary for supplying an electronic computer which cosumes a maximum power of about 400 W. Five outputs are required, namely: +5V, 16 A maximum; +12V, 8 A maximum, +20V, 8 A maximum, −12V, 0.7 A maximum; −20V, 0.7 A maximum. Of these voltages, the most critical is that of +5V; for this voltage it is required that even for the worst combination of the mains voltage and the loads, these being variable from 10 to 100% of the maximum value, the output voltage does not vary by more than ± 5%. As regards the other output voltages, it is required that under the same conditions the variation in voltage does not exceed ± 10%. The voltage of the supply mains may vary from a minimum of 187V to a maximum of 264V, with a frequency of from 45 to 65 Hz.

It is understood that with the adaptations suggested by the known art the invention lends itself equally to the creation of power supplies with different design characteristics.

Figure 1:
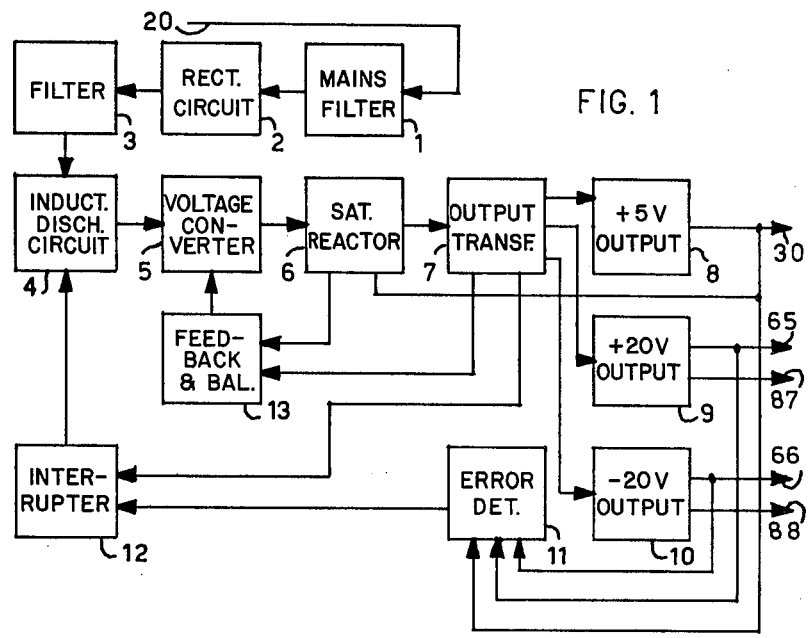
FIG. 1 is a block diagram of a power supply according to the invention.
Figure 3:
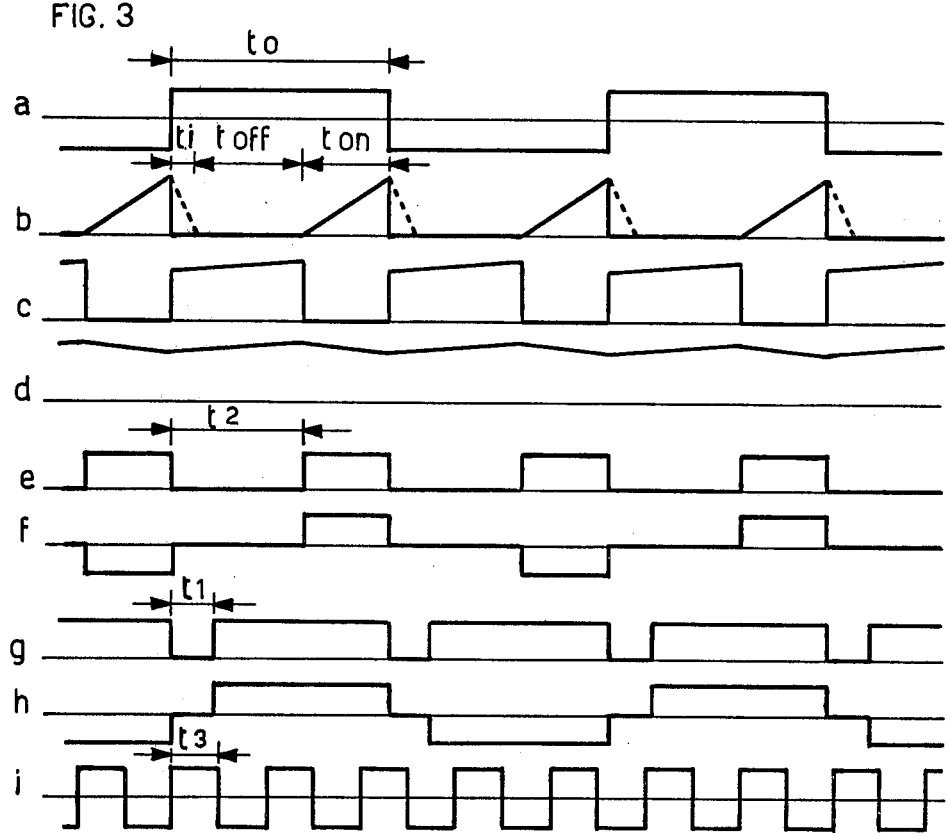
FIG. 3 is a diagram of the waveforms in the circuit of FIG. 2.
Figure 2:
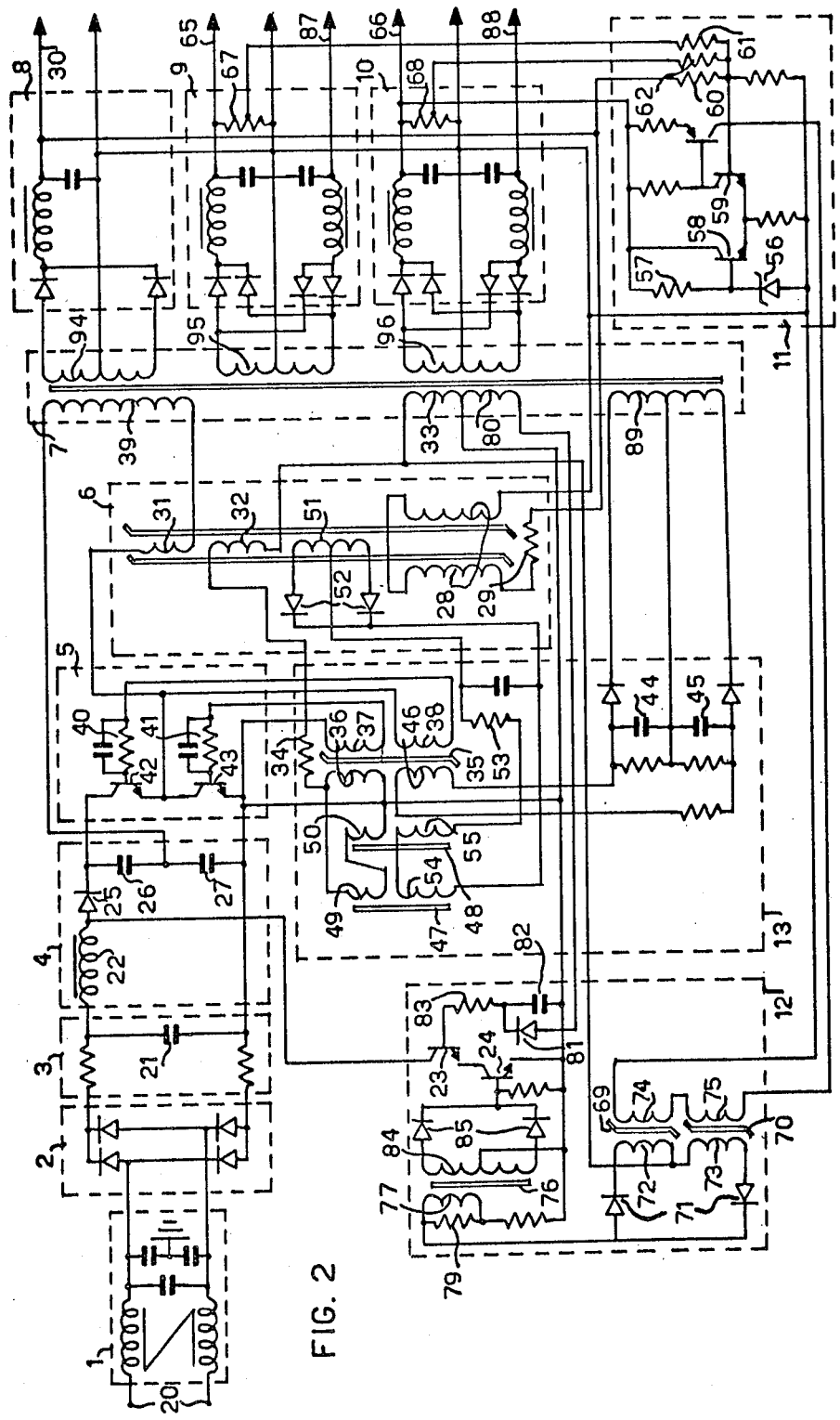
FIG. 2 is a detailed diagram of the said power supply.

The operation of the power supply can be understood with the aid of FIGS. 1, 2 and 3. In FIG. 1, the power supply is schematically divided into its functional blocks. Referring to FIG. 1, the blocks 1, 2, 3, 4 respectively represent the following: block 1, the mains filter against radio-frequency interference; block 2, the rectifying circuit which, together with block 3 comprising the filter capacitors, transforms the alternating-current of the supply mains into an unstabilized direct-current voltage; block 4, the inductive discharge circuit comprising the inductor which, charging and discharging itself alternately, under the control of the transistorized interrupter circuit of the block 12, delivers a high stabilized voltage. The voltage circuit of block 5 converts the high stabilized direct-current voltage issuing from block 4 into the required low stabilized and separate direct-current voltages. By way of block 6, comprising a saturable reactor for protection against overloading, the voltage converting circuit 5 feeds the output transformer of block 7 and the rectifying and filter circuits for the output voltages represented by the blocks 8, 9, 10, which have the outputs 30 (+5V), 65 (+20V), 66 (+12V), 87 (−20V), 88 (−12V). The direct-current voltage converting circuit used in the power supply differs from other known direct-current voltage converters by the presence of the block 6 already indicated for protection against overloading, and of the block 13 for feedback and automatic balancing of the output voltages. Control of the inductive discharge circuit of block 4 is effected by block 12 of the transistorized interrupter circuit; this, in turn, carries out the command which it receives from block 11 of the circuit detecting and amplifying the error in the output voltages with respect to the required values.

FIG. 2 gives a detailed diagram of the power supply. In this Figure, the approximate limits of the blocks indicated in FIG. 1 are given by means of dash lines.

Referring to FIG. 2, the circuits contained in the blocks of the mains filter 1 against radio-frequency interference, of the rectifying circuit 2 and of the filter capacitors 3 come within the known art and do not require a detailed description.

The inductive discharge circuit block 4 comprises the storage inductor 22 and the charge rectifying diode 25. The discharge of the energy stored in the inductor 22 through the diode 25 when the flow of the current is interrupted in the transistorized interrupter circuit of the block 12 provides for maintaining in the two capacitors 26, 27 in series a stabilized voltage constantly higher than the maximum value that the voltage in the filter capacitor 21 can assume in correspondence with the highest value of the voltage of the mains 20. The switching circuit must furnish to the power supply only the power necessary to compensate for the variations in the voltage of the mains 20 below the theoretical maximum value; the power supplied by the discharge of the inductor 22 is added in fact to that supplied to the load directly by the rectifying 2 and filtering circuit 3 through the inductor 22.

The operation of the switching circuit according to the invention can be understood with the aid of the curves of FIG. 3, where $a$ is the voltage generated by the voltage converting circuit 5, which also has the function of a clock for timing the transistorized interrupter circuit 12, $b$ is the current in the transistorized interrupter circuit 12, $c$ is the voltage across the terminals of the said transistorized interrupter circuit 12, and $d$ is the stabilized voltage at the two capacitors in series 26, 27 charged through the rectifying diode 25. The value reached by the stabilized voltage (FIG. 3, $d$) depends on the energy stored in the charge inductor 22 during the period of conduction of the transistorized interrupter circuit 12 and therefore on the duration of the period of conduction of the current in the transistorized interrupter circuit 12 (FIG. 3, $b$). The duration of the period of conduction is determined by the duration of the control voltage of the transistor 24 of the transistorized interrupter circuit 12 (FIG. 3, $e$).

In the power supply described, the peak current in the interrupter transistors 23, 24 of the transistorized interrupter circuit 12 may reach a value of about 2.5 A, for the maximum load and for the minimum value of the voltage of the mains 20. Correct operation of the switching circuit imposes not only that the transistorized interrupter circuit 12 be able to stand the maximum value of the voltage applied (about 400 V max.), but that the interruption of the current takes place in the shortest possible time. While, in fact, the dissipation of power in the transistorized interrupter circuit 12 is very limited both under conditions of complete interruption of the current ($t_{off}$, FIG. 3, $b$) and of maximum conduction of the current ($t_{on}$, FIG. 3, $b$), it reaches very high peaks in the transitory stage of passage from the condition of conduction to that of blocking ($t_i$, FIG. 3, $b$).

In FIG. 3, curve $b$, the dotted line indicates the course of the fall of the current in the case of a slow transistorized interrupter circuit, while the solid line corresponds to the case of an ideal fast circuit. In both cases, the voltage across the terminals of the transistorized interrupter circuit 12 (curve $c$) rises immediately to its full value; it is obvious that the energy dissipated during the stage of interruption of the current in the transistorized interrupter circuit 12 is proportional to the area defined by the dotted line, that is to the time $t_i$ (FIG. 3, $b$) of fall of the current.

If the time of fall $t_i$ of the current is long, the dissipation of energy in the transistorized interrupter circuit 12, which is repeated at each cycle of interruption of the current (in the case of the power supply described, 40,000 cycles/second), worsens the efficiency of the power supply and creates serious problems in regard to the dissipation of the heat generated in the transistors: it necessitates over-dimensioning with the use of a plurality of transistors in parallel and the employment of elaborate and costly systems for the dissipation of the heat generated in the power supply.

These problems have been overcome by disposing in the transistorized interrupter circuit 12 a fast transistor 24 without special characteristics of resistance at high voltages, in series with the emitter circuit of a normal transistor for high voltages 23. With this arrangement, by applying the command of interruption of the current to the fast transistor 24, which is designed for a collector voltage of only 60V, the time of fall $t_i$ of the current becomes of the order of 100 nanoseconds. If the command of interruption were applied directly to the transistor 23 for high voltage, the time of fall $t_i$ of the current would prove to be, on the other hand, about 500 nanoseconds; the power dissipated in the transistor 23 would be five times greater. With the arrangement used, even under conditions of maximum power delivered by the power supply, the power dissipated in the transistors 23, 24 is limited, so that the use of a simple dissipator enables the temperature of the transistors 23, 24 to be maintained reliably within the prescribed limits.

The stabilized voltage present at the capacitors 26, 27 in series would not be usable as such for supplying electronic apparatus because it is of a fixed and too high value and because it is not ohmically isolated with respect to the mains circuit. According to one aspect of the invention, these disadvantages are overcome by means of the insertion of a voltage converting circuit 5 with high-frequency interruption connected to an output transformer 7; the direct-current output voltages of the power supply, which are independent of one another, are obtained by rectifying and filtering the substantially rectangular voltages present on the secondary windings 94, 95, 96 of the output transformer 7 by means of the circuits 8, 9 and 10, respectively. Voltage drops in the converting circuit 5, the transformer 7 and the rectifying and filter circuits 8, 9, 10 are automatically compensated, inasmuch as the voltages supplied to the circuit 11 detecting and amplifying any error in the output voltages, which circuit controls the stabilization, are obtained directly from the outputs 30, 65, 66 of the power supply which are downstream of the voltage converting circuit 5, the output transformer 7 and the rectifying and filter circuits 8, 9, 10.

The direct-current voltage converting circuit assembly comprises the circuits 5, 6, 7, 8, 9, 10, 13; it differs from the known converting circuits by the presence of a saturable reactor 6, for protection against overloading, and of a feedback and balancing transformer 13, the functions of which may be summarized as follows.

Under conditions of normal operation, the saturable reactor 6 is maintained under conditions of saturation by the current flowing in the control windings 28; this current has a well-defined value determined by the value of the calibrated resistor 29, inasmuch as it is derived from the stabilized output voltage at the output 30 (+5V). Under these conditions of saturation, the windings 31 and 32 of the saturable reactor 6 are practically speaking short-circuited, without any reciprocal effect; the voltage necessary for the oscillation of the voltage converting circuit 5 is obtained from the winding 33 of the output transformer 7. Through the winding 32 of the saturable reactor 6 (in saturation) and the resistor 34, this voltage supplies the primary winding 36 of the feedback and balancing transformer 35. From the secondary windings 37 and 38 of the transformer 35 are obtained feedback voltages, which are respectively applied between the base and emitter of the two interrupter transistors 42, 43 through the self-bias assemblies 40 and 41. Passing alternately from the state of conduction to that of blocking, the two interrupter transistors 42, 43 produce the cyclic inversion of the stabilized current applied to the primary winding 39 of the output transformer 7, which is transformed into a rectangular wave (FIG. 3, *a*).

The frequency of oscillation of the voltage converting circuit 5 is determined by the characteristics of the feedback and balancing transformer 35 which has a square-loop magnetic core. As soon as the core of the feedback and balancing transformer 35 reaches saturation in each of the two half waves of the square wave which feeds the primary winding 36, the feedback voltage in the windings 37, 38, and therefore in the interrupter transistors 42, 43, drops abruptly, causing an immediate exchange between the two transistors 42 and 43 of the condition of conduction and blocking and the consequent inversion of the rectangular wave.

Owing to the inevitable lack of symmetry of the arrangement of components, the two half waves of the rectangular wave would very easily not come to have the same amplitude and duration. An automatic balancing device intervenes to avoid this situation, which would entail poor operation of the stabilizer. Any possible unbalance between the two half waves is detected as a difference between the opposite voltages respectively produced in each of the two filter capacitors 44 and 45 by the two opposite half waves of the rectangular voltage present on the two halves of the winding 89 of the output transformer 7. The direct current of unbalancing deriving from the possible difference between the said two opposite voltages present in the capacitors 44 and 45 flows through the winding 46 of the feedback and balancing transformer 35 and shifts the operating point of its core in a direction such as to re-establish the condition of equilibrium, advancing the saturation of the core of the feedback and balancing transformer 35 for the half wave which was tending to have the longer duration and the smaller amplitude and, on the other hand, delaying the saturation for the half wave which was tending to have the shorter duration and the greater amplitude.

In the known voltage converting circuits, the containment of any unbalance is not automatic and requires manual intervention to be applied to the components of the converter.

Under conditions of overloading, the ampere-turns produced by the current taken by the primary winding 39 of the output transfer transformer 7, flowing in the winding 31 of the saturable reactor 6, reach and tend to exceed those produced by the direct current flowing in the control winding 28 of the saturable reactor 6. When this happens, the windings of the saturable reactor 6 cease to be in a condition of very low impedance, equivalent to a short circuit. Protection against overloading is entrusted to the voltage drop which appears in the unwinding 31 of the saturable reactor 6, at the expense of the voltage applied to the primary winding 39 of the output transformer 7. The voltage drop in the primary 39 of the output transformer 7 triggers a feedback phenomenon, causing a drop in the output voltages, in particular in the same output voltage 30 from which the current for the saturation of the saturable reactor 6 through the winding 28 is obtained. In a very short time, the voltages of all of the outputs go out of stabilization, falling to a value close to zero, where they remain as long as the conditions of overloading last.

For the purpose of preventing the voltage converter 5 ceasing to oscillate under conditions of overloading because of the drop in the voltage on the feedback winding 33 of the output transformer 7, an auxiliary winding 32 is located on the saturable reactor 6 in series with the primary winding 36 of the feedback and balancing transformer 35. When the saturable reactor goes out of saturation and, consequently, a voltage drop appears on the primary winding of the saturable reactor 6, the voltage induced in the winding 32 of the said saturable reactor 6 maintains on the primary winding 36 of the feedback and balancing transformer 35 a feedback voltage sufficient to allow oscillation of the voltage converting circuit 5 and therefore permits automatic return to normal conditions on cessation of the overloading.

For the purpose of limiting the dissipation of power in the components under the conditions of overloading, it is ensured that as long as these conditions persist the power transferred from the converting circuit 5 to the output transformer 7 is greatly reduced. The power transferred to the load is limited by the series impedance represented by the saturable reactor 6, no longer in a state of saturation. For the purpose of limiting the power transferred under conditions of overloading the impedance presented by the saturable reactor 6 is accentuated by means of an increase in the frequency of oscillation of the voltage converting circuit 5.

To this end, the two transformers 47, 48 are provided, the primary windings 49, 50 of which, disposed in series with one another, are connected in parallel with the primary winding 36 of the feedback and balancing transformer 35. On the occurrence of the condition of overloading, a voltage appears on the winding 51 of the saturable reactor 6. By way of the rectifying diodes 52 and the resistor 53, this voltage causes a direct current to flow in the windings 54 and 55 of the transformers 47, 48, these windings being also interconnected in series, but in the opposite way to the windings 49, 50 of the said transformers 47, 48. This direct current flowing in the windings 54, 55 causes a partial magnetization of the cores of the transformers 47, 48 in opposite senses, so that the cores of the transformers 47, 48 reach the condition of saturation alternately, in the two opposite half waves of the rectangular wave, in a very brief time ($t_3$, FIG. 3, $i$) corresponding to about 1/5 of the time $t_o$ (FIG. 3, $a$) which, under conditions of normal operation, is required for the saturation of the core of the feedback and balancing transformer 35. As soon as one of the two transformers 47, 48 reaches saturation, it produces an abrupt drop in the voltage in the primary winding 36 of the feedback and balancing transformer 35, and therefore advanced inversion of the rectangular wave, whereby under conditions of overloading the frequency of oscillation of the voltage converter 5 increases fivefold, passing from the normal value of about 20 KHz to that of about 100KHz (FIG. 3, $i$), and the impedance presented by the saturable reactor 6, which is not in a saturated condition, increases in proportion.

On switching-on of the power supply, the conditions are initially similar to those of overloading, inasmuch as the filtering capacitors of the output circuits 8, 9, 10 are to be charged and the current which brings the saturable reactor 6 to saturation is lacking in the winding 28 thereof. Due to the already indicated auxiliary mechanism of feedback through the winding 32 of the saturable reactor 6, the voltage converting circuit 5 is able to go into oscillation at the highest frequency (100 KHz). If the load of the power supply is not excessive, the voltage at the output 30 of the power supply can rise gradually, bringing the saturable reactor 6 to saturation conditions and, therefore, the power supply to conditions of normal operation. The same happens when the power supply emerges from the conditions of overloading by the return of the load to within the normal limits.

The above-indicated conditions of overloading excepted, the voltage converting circuit 5 produces a well-nigh perfectly rectangular voltage ($a$, FIG. 3) of substantially constant frequency (20 KHz), inasmuch as it is fed with an already stabilized voltage, and the period of oscillation is determined by the time $t_o$ (FIG. 3, $a$) that the rectangular voltage applied to the primary winding 36 of the feedback and balancing transformer 35 takes to bring the square-loop core of the said feedback and balancing transformer 35 to saturation.

This rectangular voltage (FIG. 3, $a$) of stable frequency is used for timing the control circuit 12 of the voltage stabilizer 4, in contrast to other switching power supplies which require a separate oscillator for a similar purpose.

Unlike other switching power supplies, the stabilization of the voltage is obtained by varying the time of flow of the current in the transistorized interrupter circuit 12, which controls the switching stabilizer 4, with a constant frequency, instead of leaving the duration of the time of flow of the current in the transistorized interrupter circuit 12 substantially constant, and varying the period of repetition of this flow of current. The solution chosen maintains the frequency of operation of the switching circuit always at the highest values, corresponding to the best filtering conditions, the most favourable response times and full utilization of the energy stored in the storage inductor 22. It moreover lends itself to the use of magnetic amplifiers as active elements in the regulating circuit for the stabilization of the output voltages. Apart from their very high reliability, magnetic amplifiers offer the great advantage of perfect ohmic isolation between the stabilized output circuits and the switching stabilizing circuit, which is ohmically connected to the mains. Due to the isolation ensured by the magnetic amplifiers 69, 70, it is possible to control the transistorized interrupter circuit 12 determining the stabilization directly as a function of the voltages picked off at the outputs 30, 65, 66 of the power supply. On the other hand, such an arrangement would not be possible with amplifiers comprising semiconductors, which necessarily require the existence of an ohmic connection between the input and output circuits of the amplifier.

As reference voltage for the stabilizing circuit 11 there is used the voltage of about 5V of a Zener diode 56 fed via a resistor 57 with the stabilized voltage of +12V of the output 66. Through the medium of the differential circuit of the transistors 58 and 59, the reference voltage is compared with a weighted combination of the output voltages of the power supply. By means of the resistor 60 connected to the output 30 of +5V, the resistor 61 connected to the voltage divider 67 connected to the output 65 of +20V and the resistor 62 connected to the voltage divider 68 connected to the output 66 of +12V, the output voltages of the power supply are all picked off simultaneously, the characteristics of stabilization being optimized as a function of the importance, or "weight", of the various output voltages. Although the maximum weight is given to the most important voltage, +5V, by sacrificing perfect stabilization of this voltage and by making the stabilizing circuit also sensitive to the variations in the other output voltages of +20V and +12V, the objective of stabilizing all the output voltages within the specified limits of ± 5% for the voltage of +5V and of ± 10% for the other voltages is achieved.

Such a result is possible due to the error amplifying and detecting circuit 11 and to the control of the interrupter transistors 23, 24 through magnetic amplifiers (69, 70).

The voltage for the control of the interrupter transistors 23, 24 is obtained from the winding 33 of the output transformer 7. This is therefore a matter of a rectangular wave corresponding to the curve of FIG. 3a. This is applied to the primary winding 77 of the driving transformer 76 through the windings 72, 73 of the two magnetic amplifiers 69, 70 and the diodes 71. The driving voltage of the interrupter transistors 23, 24 is obtained by rectifying the voltage which appears at the ends of the two halves of the secondary winding 84 of the driving transformer 76 (FIG. 3, f); the two positive half waves are applied to the base of the transistor 24 through the diodes 85 (FIG. 3, e).

The current from the stabilizing circuit 11 is proportional to the error detected in the weighted output voltage with respect to the reference voltage of the Zener diode 56; it flows in the windings 74 and 75 of the magnetic amplifiers 69, 70 in a sense such as to oppose the magnetizing effect produced by the two half waves of the rectangular voltage coming from the winding 33 of the output transformer 7 and applied, respectively, to the windings 72 and 73 of the magnetic amplifiers 69, 70 through the diodes 71.

On switching-on the power supply and whenever the power supply tends to go out of stabilization, the direct current in the windings 74, 75 of the magnetic amplifiers 69, 70 is wanting or is very reduced. Under these conditions, the residual induction of the cores of the magnetic amplifiers 69, 70 maintains them in a state already close to saturation. The rectangular voltage coming from the winding 33 of the output transformer 7 brings the cores of the magnetic amplifiers 69, 70 to saturation in a very short time $t_1$ (FIG. 3, g). During the time $t_1$, the rectangular voltage drops in the windings 72 and 73 of the magnetic amplifiers 69, 70, whereby the voltage applied to the primary winding 77 of the driving transformer 76 is very low, aided by the presence of the shunt resistor 79. At the end of the time $t_1$, on the other hand, the full rectangular voltage appears on the primary winding 77 of the driving transformer 76 (FIG. 3, h), in consequence of the saturation of the cores of the magnetic amplifiers 69, 70 which has taken place. The resultant driving voltage of the transistor 24 has the form indicated by the curve g, FIG. 3, whereby there is obtained the maximum flow of current in the charge inductor 22, corresponding to the whole of the time for which this voltage remains positive, and therefore the maximum storage and subsequent discharge of energy.

As soon as the power supply goes into stabilization through the effect of the voltage produced by the switching circuit, the current coming from the error detecting and amplifying circuit 11 flows in the windings 74 and 75 of the magnetic amplifiers 69 and 70 and produces in each of the two cores of the magnetic amplifiers 60 and 70 a state of premagnetization opposed to that produced by the rectangular voltage of the winding 33 of the output transformer, which acts on the windings 72, 73 through the diodes 71. Until this rectangular voltage has remained for a time $t_2$, greater than $t_1$ (FIG. 3, e), sufficient to overcome such premagnetization, the voltage of the winding 33 of the output transformer drops on the windings 72, 73 of the magnetic amplifiers 69, 70. The time for which a positive voltage is applied to the base of the transistor 24 (FIG. 3, c) is thus reduced; consequently, the time of conduction, and therefore the energy stored in the inductor 22 is given up during the discharge.

An increase in the output voltage of the power supply tends to be compensated by means of a reduction of the time of flow of the current in the transistors 23 and 24, and therefore of the energy transferred by the inductive discharge circuit 4. A reduction of the said voltage, on the other hand, brings about an increase in the said time, as required for the operation of the stabilizing circuit.

As has been seen, the control voltage is applied to the base of the fast transistor 24, while the base of the high voltage transistor 23 is connected through the resistor 83 to a constant level of about +6V obtained from the winding 80 of the output transformer 7 through the rectifying diode 81 and the capacitor 82. The said transistor 23 is therefore distinctly in a state of saturation when the transistor 24 becomes conducting and, on the other hand, it comes to have its base decidedly negative with respect to the emitter when the said transistor 24 becomes blocked, reducing to the minimum the time of fall of the current due to the storage of the charges in the base. The high voltage transistor 23 protects the fast transistor 24 from failure; by itself, on the other hand, the latter would withstand a very low collector voltage.

What we claim is:
1. A switching power supply coupled to AC mains for supplying a stabilized DC output voltage to an electronic apparatus, comprising:
   a rectifying circuit having an input connected directly to said AC mains;
   a voltage stabilizing circuit including a storage inductor, and an arrangement of a diode and a capacitor in series with said inductor for generating a DC stabilizing voltage;
   said rectifying circuit having an output connected to said inductor;
   a frequency generating means for generating a frequency higher than the AC mains frequency;
   an interrupter circuit, having a switching cycle of constant repetition rate controlled by said frequency generating means, connected in parallel with said diode and said capacitor whereby said inductor is caused to store magnetic energy during a charging interval of said switching cycle corresponding to closing of said interrupter circuit, and whereby the magnetic energy stored in said inductor is transferred to said capacitor through said diode during a discharging interval of said switching cycle corresponding to opening of the said interrupter circuit;
   means responsive to the deviation of said stabilized DC output voltage with respect to a reference voltage for conditioning said interrupter circuit to alter a time ratio of charging and discharging of said inductor within said switching cycle; and
   a limiting circuit, having an overload detecting means for detecting an overload of said power supply, connected to the output of said stabilizing circuit to shorten the repetition cycle of said stabilizing circuit to limit dissipation of power in the power supply during said overload.

2. A power supply according to claim 1, wherein said interrupter circuit comprises a semiconductive element, and said responsive means comprises a magnetic amplifier.

3. A power supply according to claim 1, wherein said power supply further includes:
   said frequency generating means having a voltage converting circuit connected at a junction of said diode and said capacitor for converting said DC stabilizing voltage to an AC voltage, and having a primary of a transformer connected to the output of said voltage converting circuit;
   a plurality of rectifying and filtering circuits connected to secondaries of said transformer whereby each of said filtering circuits delivers a stabilized DC output voltage;

said responsive means having a voltage detecting means for detecting a combination of said stabilized DC output voltages, and wherein said combination of output voltages is compared with said reference voltage to compensate for voltage drops of said voltage converting circuit; and said voltage converting circuit having a balancing circuit for balancing opposite half-waves of voltage appearing at said secondaries, and wherein said balancing circuit includes a magnetic amplifier responsive to an unbalance of said opposite half-waves of voltage.

4. A power supply according to claim 1, wherein said overload detecting means comprises at least one saturable reactor connected in series with said voltage stabilizing circuit.

* * * * *